United States Patent
Kang et al.

(10) Patent No.: US 12,327,547 B2
(45) Date of Patent: Jun. 10, 2025

(54) METHOD AND APPARATUS FOR TRAINING NEURAL NETWORK, AND METHOD AND APPARATUS FOR AUDIO PROCESSING

(71) Applicant: BEIJING XIAOMI MOBILE SOFTWARE CO., LTD., Beijing (CN)

(72) Inventors: Wei Kang, Beijing (CN); Povey Daniel, Beijing (CN); Fangjun Kuang, Beijing (CN); Liyong Guo, Beijing (CN); Zengwei Yao, Beijing (CN); Long Lin, Beijing (CN); Mingshuang Luo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 18/080,713

(22) Filed: Dec. 13, 2022

(65) Prior Publication Data
US 2023/0386449 A1    Nov. 30, 2023

(30) Foreign Application Priority Data

May 31, 2022    (CN) .......................... 202210616310.0

(51) Int. Cl.
*G10L 15/06*    (2013.01)
*G10L 15/16*    (2006.01)
*G10L 15/197*    (2013.01)

(52) U.S. Cl.
CPC ............ *G10L 15/063* (2013.01); *G10L 15/16* (2013.01); *G10L 15/197* (2013.01)

(58) Field of Classification Search
CPC ...... G10L 15/063; G10L 15/16; G10L 15/197
See application file for complete search history.

(56) References Cited

U.S. PATENT DOCUMENTS 11,887,583 B1 *    1/2024   Strimel .................. G10L 15/16
2021/0312905 A1 *  10/2021  Zhao ....................... G10L 15/16

FOREIGN PATENT DOCUMENTS

CN    114861828 A    8/2022

OTHER PUBLICATIONS

Extended European Search Report of EP Application No. 22216741.3 dated Aug. 18, 2023, (13p).

(Continued)

*Primary Examiner* — Sonia L Gay
(74) *Attorney, Agent, or Firm* — Arch & Lake LLP; Shen Wang; Hao Tan

(57) ABSTRACT

The present disclosure provides a method and apparatus for training a neural network, and a method and apparatus for audio processing. The method includes: encoding training audio data input to an encoder network to obtain a first encoding result, and predicting a text label corresponding to the training audio data input to a prediction network to obtain a first prediction result; jointing the first encoding result with the first prediction result to obtain a first joint result; pruning the first encoding result and the first prediction result according to the first joint result to obtain a second encoding result and a second prediction result; performing a joint processing on the second encoding result and the second prediction result input to a joiner network to obtain a second joint result, and adjusting network parameters of the encoder network, the prediction network and the joiner network according to the second joint result.

20 Claims, 3 Drawing Sheets

(56) References Cited

OTHER PUBLICATIONS

Fangjun Kuang et al, "Pruned RNN-T for fast, memory-efficient ASR training", arxiv.org, XP091257807, Jun. 23, 2022, 5 pages.

Jinyu Li et al, "Improving RNN Transducer Modeling for End-To-End Speech Recognition", Speech and Language Group, Microsoft, XP033718905, Dec. 14, 2019, 8 pages.

Xiaohui Zhang et al, "Benchmarking LF-MMI, CTC and RNN-T Criteria for Streaming ASR", Facebook AI, USA, XP33891342, Jan. 19, 2021, 6 pages.

Yangyang Shi, et al, "Dynamic Encoder Transducer: A Flexible Solution For Trading Off Accuracy For Latency", P081932856, Apr. 5, 2021, 5 pages.

A. Graves et al.,"Connectionist temporal classifification: labelling unsegmented sequence data with recurrent neural networks," in Proceedings of the 23rd international conference on Machine learning, Pittsburgh, PA, 2006,(8p).

A. Vaswani et al., "Attention is all you need," arXiv:1706.03762v5 [cs.CL], Dec. 6, 2017, (15p).

A. Graves, "Sequence transduction with recurrent neural networks," arXiv:1211.3711v1 [c.NE], Nov. 14, 2012, (9p).

"Torchaudio: an audio library for PyTorch", URL: https://github.com/pytorch/audio, (4p).

"Warp-transducer", URL: https://github.com/HawkAaron/warp-transducer, (3p).

"Csukuangfi/transducer-loss-benchmarking", https://github.com/csukuangfj/transducer-loss-benchmarking,(9p).

* cited by examiner

METHOD AND APPARATUS FOR TRAINING NEURAL NETWORK, AND METHOD AND APPARATUS FOR AUDIO PROCESSING

This application is based upon and claims priority to Chinese Patent Application No. 202210616310.0, filed May 31, 2022, the entire content of which is incorporated herein by reference for all purposes.

TECHNICAL FIELD

The present disclosure relates to the field of audio processing technologies, and in particular to a method and apparatus for training a neural network, and a method and apparatus for audio processing.

BACKGROUND

In recent years, audio processing technologies such as audio recognition have developed gradually. With the increasing accuracy, the audio processing technologies have been playing a substantial role in many fields. Currently, the field of audio processing includes connectionist temporal classification (CTC) technologies, attention-based model technologies and Recurrent Neural Network transducer (RNN-T) technologies, wherein the RNN-T technologies have the best effect in practice. However, in the related art of RNN-T technologies, operations for training the neural network are relatively complicated and occupy a lot of memory, which makes it impossible to achieve rapid calculation, thereby greatly reducing the application of the audio processing technologies.

SUMMARY

The present disclosure provides a method and apparatus for training a neural network, and a method and apparatus for audio processing.

According to a first aspect of the present disclosure, a method for training a neural network is provided, the method includes:
  encoding training audio data input to an encoder network to obtain a first encoding result, and predicting a text label corresponding to the training audio data input to a prediction network to obtain a first prediction result;
  jointing the first encoding result with the first prediction result to obtain a first joint result;
  pruning the first encoding result and the first prediction result respectively according to the first joint result to obtain a second encoding result and a second prediction result; and performing a joint processing on the second encoding result and the second prediction result input to a joiner network to obtain a second joint result, and adjusting network parameters of the encoder network, the prediction network and the joiner network according to the second joint result.

According to a second aspect of the present disclosure, an electronic device is provided, the electronic device includes a memory and a processor, wherein the memory is configured to store computer instructions executable on the processor, and when executing the computer instructions the processor is configured to perform the method according to the first aspect or the second aspect.

According to a third aspect of the present disclosure, a non-transitory computer readable storage medium storing a computer program is provided, wherein the computer program, when executed by a processor, causing the processor to implement the method described in the first aspect or the second aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
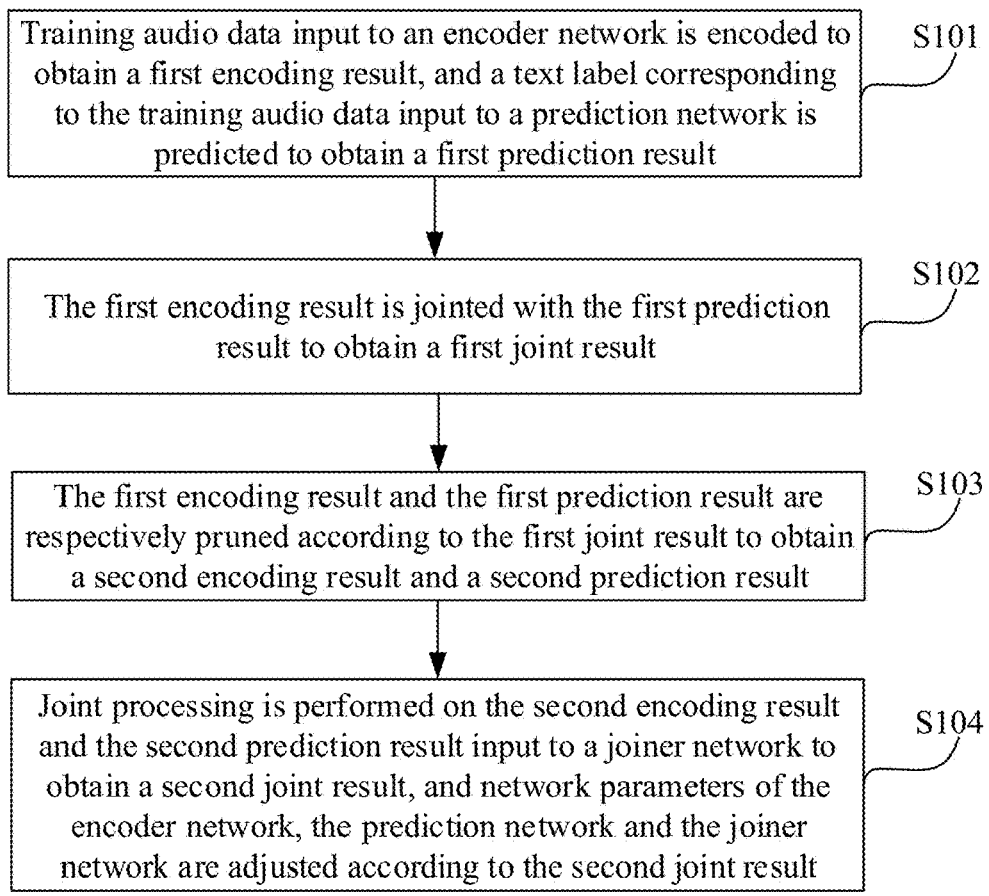
FIG. 1 is a flowchart illustrating a method for training a neural network according to an embodiment of the present disclosure.

Embodiments will be described in detail here, examples of which are illustrated in the accompanying drawings. When the following description refers to the drawings, unless otherwise indicated, the same numerals in different drawings indicate the same or similar elements. The implementations set forth in the following description of embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only used for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be used to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Up to now, the field of speech recognition has developed for decades, that is, from an initial sequence similarity matching to a modeling based on Gaussian mixture model and hidden Markov model, and a later developed hybrid system based on a neural network. For decades, it is very complicated to build a speech recognition system, and a complicated data alignment process is needed before building a model. In recent years, an end-to-end model has entered a high-speed development stage. The end-to-end model can not only greatly simplify a modeling process of the speech recognition, that is, remove the complicated data alignment process, but also achieve better recognition results.

Generally speaking, there are three kinds of models to implement the end-to-end model, namely, a connectionist temporal classification (CTC), an attention-based model, and a RNN transducer (RNN-T). Among these three kinds of models, the CTC and the RNN-T are natural streaming models, which can be used for frame synchronization decoding. However, the attention-based model needs some additional modifications so as to achieve streaming decoding. These modifications are not only complicated, but also will bring up a loss of recognition accuracy. Among the CTC model and the RNN-T model, the CTC model has a premise that frames are statistically independent, so it is difficult to utilize CTC model to obtain an excellent recognition rate without adding external language models. Therefore, considering all aspects, the RNN-T model is much more useful in the application.

A definition of a RNN-T loss function involves a calculation on a four-dimensional matrix, namely, a matrix of (N, T, U, V), wherein N represents a number of samples in a batch, T represents an audio frame number dimension, U represents a text label sequence dimension and V represents a modeling unit dimension. When calculating the RNN-T loss function, the operation of such a huge four-dimensional matrix not only leads to relatively low calculation efficiency, but also takes up a lot of memory, and a number of parallel batches cannot be increased on a given amount of memory. In one word, during the implementation of the existing RNN-T, it is impossible to achieve rapid calculation, therefore making training of the RNN-T model slow, and greatly reduced the practicability.

Based on this, according to a first aspect of the embodiments of the present disclosure, there is provided a method for training a neural network. Referring to FIG. 1, it shows a flow of the method. The method for training the neural network includes steps S101 to S104.

Figure 2:
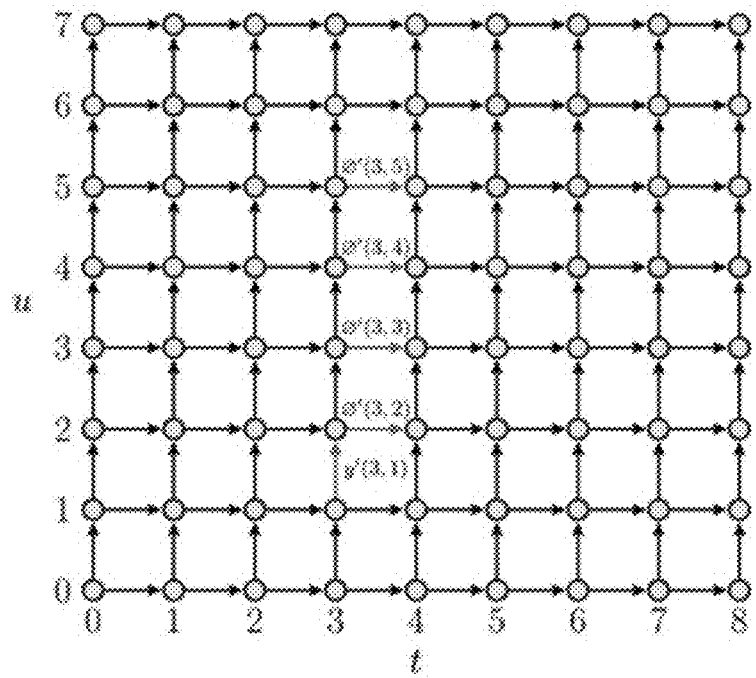
FIG. 2 is a schematic diagram illustrating a calculation manner of a RNN-T loss function in the related art.

The method for training the neural network can be applied to a process of training a neural network for audio processing, such as a process of training the RNN-T model. The RNN-T model usually consists of three parts, namely, an encoder network, a prediction network and a joiner network. An output of the encoder network is a vector with dimensions of (T, E), an output of the prediction network is a vector with dimensions of (U, D), and an output of the is a vector with dimensions of (T, U, V), where T represents a number of audio frames, E represents an output dimension of the encoder network, U represents a number of text label sequences correspondingly annotated to audio, D is an output dimension of the prediction network and V is a number of modeling units, that is, a number of characters. If a batch dimension N is added, an output of the RNN-T model is a matrix with dimensions of (N, T, U, V). In the related art, the calculation of the RNN-T loss function is to traverse all the paths conforming to the text label sequences under the matrix by using a forward-backward algorithm, and then calculate total scores of the paths, as shown in FIG. 2, it only shows two dimensions of T and U, this makes the calculation of the RNN-T model not only consume a lot of memory, but also have a very high computational density.

In step S101, training audio data input to an encoder network is encoded to obtain a first encoding result, and a text label corresponding to the training audio data input to a prediction network is predicted to obtain a first prediction result.

The first encoding result is the above vector with the dimensions of (T, E), and the first prediction result is the vector with the dimensions of (U, D). If the training audio data and the text label corresponding to the training audio data are input to the encoder network and the prediction network in batch, the first encoding result is a vector with dimensions of (N, T, E), and the first prediction result is a vector with dimensions of (N, U, D).

In step S102, the first encoding result is jointed with the first prediction result to obtain a first joint result.

For example, the first encoding result and the first prediction result can be input to a joint module for a joint processing to obtain the first joint result, wherein the joint module can be a trivial joiner network. The trivial joiner network is a simplified version of a commonly used joiner network, and the commonly used joiner network contains nonlinear transformations (for example, tanh or Relu), while the trivial joiner network only contains a linear addition operation, for example, weighted summation is performed on the first encoding result and the first prediction result by using preconfigured weights to obtain the first joint result.

In a possible embodiment, each element in the first joint result at least has a coordinate in an audio frame number dimension and a coordinate in a text label sequence dimension, and each element can have a probability of outputting the text label and a probability of outputting a null character.

Specifically, the first encoding result can be defined as $L_{encoder}(t, v)$, the first prediction result can be defined as $L_{decoder}(u, v)$, and the first joint result $L_{trivial}(t, U,$ can be calculated by following formulas:

$$L_{trivial}(t, u, v) \stackrel{def}{=} L_{encoder}(t, v) + L_{decoder}(u, v) - L_{normalizer}(t, u),$$

$$\text{and } L_{normalizer}(t, u) \stackrel{def}{=} \log \sum_v \exp(L_{encoder}(t, v) + L_{decoder}(u, v)).$$

That is, the first joint result is a matrix L of (T, U, V) (assuming that a batch size N is 1), and each element l (t, u, v) in the matrix L represents a probability of a character v (the character v can be a text label or a null character) output by an element whose coordinate is t in the audio frame number dimension and u in the text label sequence dimension (that is, the element whose coordinate is (t, u)). Therefore, following definitions can be made:

$$y(t, u) = L(t, u, y_{u+1})$$

$$\emptyset(t, u) = L(t, u, \emptyset)$$

wherein y(t, u) represents a logarithmic probability of the element with the coordinate (t, u) transferred upwardly (i.e., the probability of outputting the text label), and Ø(t, u) represents a logarithmic probability of the element with the coordinate (t, u) transferred to the right (i.e., the probability of outputting the null character).

With such definitions, y(t, u) and Ø(t, u) can be constructed by simple matrix multiplication and query algorithm, thereby avoiding the allocation of the huge four-dimensional matrix and reducing the memory and improving the speed.

It can be understood that, compared with the joint processing of the joiner network, in this step, by performing the joint processing on the first encoding result and the first prediction result to obtain the first joint result, the required calculation power can be reduced, the occupation of the memory can be reduced, and the processing efficiency can be improved.

It should be understood that the calculation method of the first joint result has been described in step S102. However, it should be understood that other possible methods of calculating the first joint result are also within the protection scope of the present disclosure, that is, the first encoding result can also be jointed with the first prediction result by other calculation methods to obtain the first joint result.

In step S103, the first encoding result and the first prediction result are respectively pruned according to the first joint result to obtain a second encoding result and a second prediction result.

Figure 3:
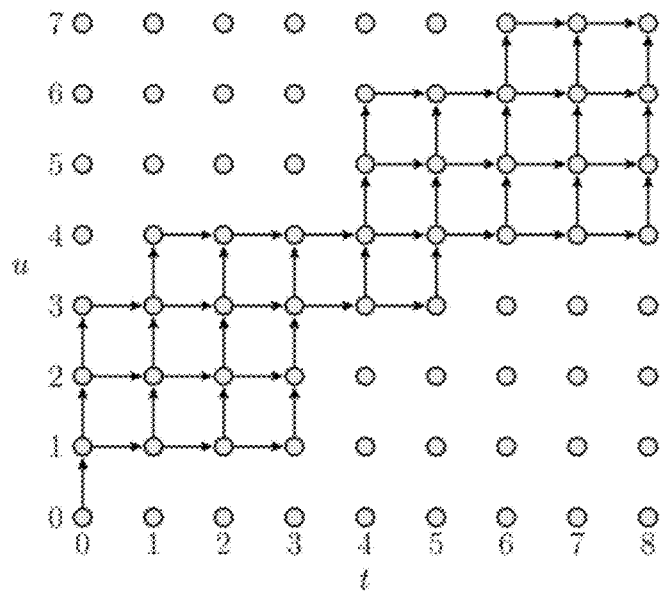
FIG. 3 is a schematic diagram illustrating a calculation manner of a RNN-T loss function according to an embodiment of the present disclosure.

In most cases, audio data and the text label are monotonous, that is, it is almost impossible to output a large number of text labels in a certain frame of the audio data, and thus a path close to the actual should be shown in FIG. 3, and only a certain number of text labels will be output in the certain frame. Therefore, the text label sequence dimension can be pruned, so that operations only need to be performed on a reduced matrix.

In a possible embodiment, step S103 can be performed as follows.

Obtaining Firstly, gradient information of the each element in the first joint result is obtained. For example, gradient information y'(t, u) indicating a probability that the each element in the first joint result outputs the text label and gradient information Ø'(t, u) indicating a probability that the each element in the first joint result outputs a null character are obtained.

Determining, according to the gradient information of each element in the first joint result, pruning bounds in a plane composed of the audio frame number dimension and the text label sequence dimension. For example, at a $t^{th}$ frame in the audio frame number dimension, for each serial number in the text label sequence dimension, a sum of gradient information of respective elements in a sequence range of a preset size (s_range, denoted as S in the formula) starting from the serial number can be determined as a total gradient corresponding to the serial number, wherein t is an integer greater than or equal to 1, that is, the $t^{th}$ frame may be each frame in the audio frame number dimension; and then, a sequence range of the preset size starting from a serial number for which the total gradient is maximum is determined as the pruning bounds of the $t^{th}$ frame. After the pruning bounds of each frame is determined, the pruning bounds in the plane composed of the audio frame number dimension and the text label sequence dimension can be obtained.

Specifically, the serial number pt for which the total gradient is maximum at the $t^{th}$ frame can be determined by the following formula:

$$p_t = \mathrm{argmax}_{p=0}^{U-S+1}\left(-y'(t, p-1) + \sum_{u=p}^{p+S-1} \emptyset'(t, u)\right).$$

where U is a maximum serial number in the text label sequence dimension.

In addition, the serial number for which the total gradient is maximum can satisfy at least one of the following:
a difference between the serial number for which the total gradient is maximum and a maximum serial number in the text label sequence dimension is greater than or equal to the preset size, that is, 0≤pt≤U-S+1;
the serial number for which the total gradient is maximum is less than or equal to a starting point serial number of pruning bounds of a $(t+1)^{th}$ frame, that is, pt≤pt+1;
a difference between the serial number for which the total gradient is maximum and the starting point serial number of the pruning bounds of the $(t+1)^{th}$ frame is less than the preset size, that is, pt+1−pt≤S.

Pruning the first encoding result and the first prediction result are respectively according to the pruning bounds to obtain the second encoding result and the second prediction result. For example, the first encoding result and the first prediction result are respectively expanded on at least one of the audio frame number dimension and the text label sequence dimension, so that each element in the first encoding result has the coordinate in the audio frame number dimension and the coordinate in the text label sequence dimension, that is, the first encoding result is expanded from the dimensions of (N, T, V) to the dimensions of (N, T, U, V), and the first prediction result is expanded from the dimensions of (N, T, V) to the dimensions of (N, T, U, V); and then, the first encoding result and the first prediction result are respectively pruned according to the pruning bounds in the plane composed of the audio frame number dimension and the text label sequence dimension to obtain the second encoding result and the second prediction result, that is, the second encoding result and the second prediction result are both matrices with dimensions of (N, T, s_range, V). Since s_range is much smaller than U, and these two matrices are much smaller than the four-dimensional matrix with the dimensions of (N, T, U, V), the memory (i.e., computing density) used by the joiner network during calculation can be greatly reduced.

It should be understood that the pruning method in step S103 can be implemented separately or in combination with part or all of one or more embodiments of the present disclosure. For example, the pruning method in step S103 can prune the first joint result obtained in step S102 or other joint results.

In step S104, a joint processing is performed on the second encoding result and the second prediction result input to a joiner network to obtain a second joint result, and network parameters of the encoder network, the prediction network and the joiner network are adjusted according to the second joint result, wherein the network parameters can be parameters such as weights and offsets of nodes in a network layer.

Since s_range is much smaller than U, and these two matrices are much smaller than the four-dimensional matrix with the dimensions of (N, T, U, V), the memory (i.e., computing density) used by the joiner network during calculation can be greatly reduced. The second joint result can be a matrix with the dimensions of (N, T, s_range, V).

In a possible embodiment, a first network loss value can be determined according to the second joint result, and the network parameters of the encoder network, the prediction network and the joiner network can be adjusted according to the first network loss value. When calculating the first network loss value, the forward-backward algorithm can be used to traverse all the paths conforming to the text label sequences under the matrix of the second joint result, and then sum up the network loss value of the paths. The adjustment of the network parameters can be stopped when the first network loss value is within a preset error range, or iteration times of the first network loss value reach a preset threshold.

In addition, a second network loss value can be determined according to the first joint result, and the network parameters of the encoder network, the prediction network and the joiner network can be adjusted according to the first network loss value and the second network loss value. When calculating the first network loss value, the forward-backward algorithm can be used to traverse all the paths conforming to the text label sequences under the matrix of the second joint result, and then total scores of the paths are calculated. For example, weighted summation can be performed on the first network loss value and the second network loss value to obtain a comprehensive network loss value, and then the network parameters of the neural network can be adjusted by using the comprehensive network loss value to further increase the stability of network training.

According to the method for training the neural network provided by the present disclosure, by encoding training audio data input to an encoder network to obtain a first encoding result, and predicting a text label corresponding to the training audio data input to a prediction network to obtain a first prediction result, the first encoding result with the first prediction result can be jointed to obtain a first joint result, the first encoding result and the first prediction result are respectively pruned according to the first joint result to obtain a second encoding result and a second prediction result, and finally, a joint processing is performed on the second encoding result and the second prediction result input to a joiner network to obtain a second joint result, and then network parameters of the encoder network, the prediction network and the joiner network are adjusted according to the second joint result. Since the first encoding result and the first prediction result are pruned and then input to the joiner network, the calculation amount of the joiner network can be reduced, and the calculation power of adjusting the network parameters by the second joint result can be reduced, therefore, the memory occupied in a process of training a model such as the RNN-T can be reduced, the fast calculation can be realized, and the practicability of the audio processing technologies can be improved.

The method for training RNN-T provided by the present disclosure can effectively bypass iterative operations on the four-dimensional matrix, so as to realize the efficient calculation of the RNN-T loss function by using the pruning algorithm without losing the modeling ability. Compared with the existing implementation, in the case of reducing the usage of the memory by several times, the computing speed can be increased by more than 10 times. Therefore, the problems of excessive consumption of the memory and low calculation efficiency when calculating the RNN-T loss function are solved, the training speed of the RNN-T model is greatly improved, and the application of the RNN-T model in production practice is promoted.

In some embodiments of the present disclosure, the first encoding result and the first prediction result are respectively pruned according to following methods to obtain a second encoding result and a second prediction result.

Firstly, gradient information of the each element in a joint result obtained by jointing the first encoding result with the first prediction result is obtained. For example, gradient information y'(t, u) indicating a probability that the each element in the joint result outputs the text label and gradient information Ø'(t, u) indicating a probability that the each element in the joint result outputs a null character are obtained.

Next, pruning bounds is determined in a plane composed of the audio frame number dimension and the text label sequence dimension according to the gradient information of the each element in the joint result. For example, at a $t^{th}$ frame in the audio frame number dimension, a sum of gradient information of respective elements in a sequence range of a preset size (s_range, denoted as S in the formula) starting from each serial number in the text label sequence dimension can be determined as a total gradient corresponding to the each serial number, wherein t is an integer greater than or equal to 1, that is, the $t^{th}$ frame is each frame of the audio frame number dimension; and then, a sequence range of the preset size starting from a serial number for which the total gradient is maximum is determined as the pruning bounds of the $t^{th}$ frame. After the pruning bounds of each frame is determined, the pruning bounds in the plane composed of the audio frame number dimension and the text label sequence dimension can be obtained.

Specifically, the serial number pt for which the total gradient is maximum at the $t^{th}$ frame can be determined by the following formula:

$$p_t = \operatorname{argmax}_{p=0}^{U-S+1}\left(-y'(t, p-1) + \sum_{u=p}^{p+S-1} \varnothing'(t, u)\right).$$

where U is a maximum serial number in the text label sequence dimension.

In addition, the serial number for which the total gradient is maximum can satisfy at least one of the following:
- a difference between the serial number for which the total gradient is maximum and a maximum serial number in the text label sequence dimension is greater than or equal to the preset size, that is, $0 \leq pt \leq U-S+1$;
- the serial number for which the total gradient is maximum is less than or equal to a starting point serial number of pruning bounds of a $(t+1)^{th}$ frame, that is, $pt \leq pt+1$;
- a difference between the serial number for which the total gradient is maximum and the starting point serial number of the pruning bounds of the $(t+1)^{th}$ frame is less than the preset size, that is, $pt+1-pt \leq S$.

Finally, the first encoding result and the first prediction result are respectively pruned according to the pruning bounds to obtain the second encoding result and the second prediction result. For example, the first encoding result and the first prediction result are respectively expanded on at least one of the audio frame number dimension and the text label sequence dimension, so that each element in the first encoding result has the coordinate in the audio frame number dimension and the coordinate in the text label sequence dimension, that is, the first encoding result is expanded from the dimensions of (N, T, V) to the dimensions of (N, T, U, V), and the first prediction result is expanded from the dimensions of (N, T, V) to the dimensions of (N, T, U, V); and then, the first encoding result and the first prediction result are respectively pruned according to the pruning bounds in the plane composed of the audio frame number dimension and the text label sequence dimension to obtain the second encoding result and the second prediction result, that is, the second encoding result and the second prediction result are both matrices with dimensions of (N, T, s_range, V). Since s_range is much smaller than U, and these two matrices are much smaller than the four-dimensional matrix with the dimensions of (N, T, U, V), the memory (i.e., computing density) used by the joiner network during calculation can be greatly reduced.

Figure 4:
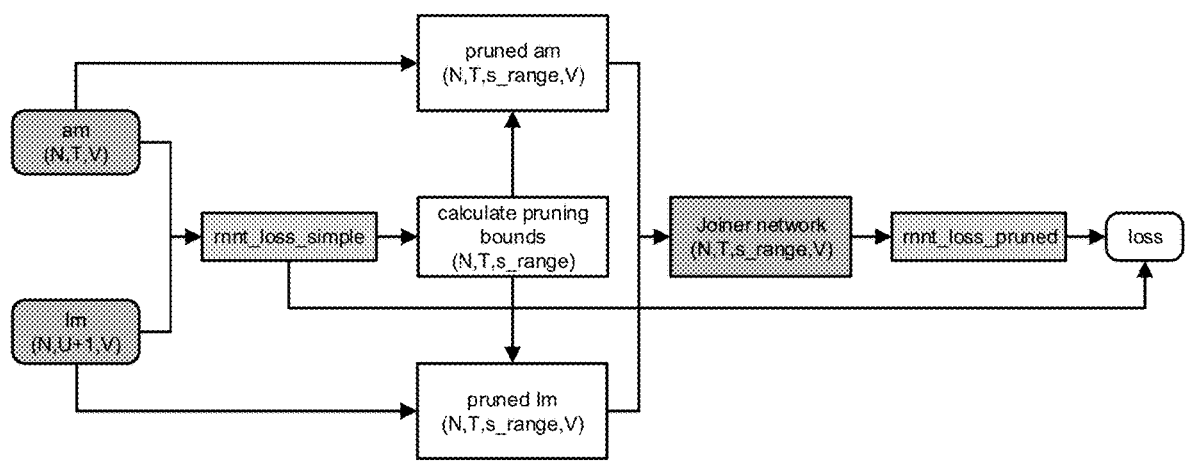
FIG. 4 is a flowchart illustrating a method for training a neural network according to an embodiment of the present disclosure.

Referring to FIG. 4, it exemplarily shows a flowchart of a method for training a neural network provided by the present disclosure. As can be seen from FIG. 4, firstly, an encoder network am encodes training audio data to obtain a first encoding result with dimensions of (N, T, V), and a prediction network lm predicts a text label corresponding to the training audio data to obtain a first prediction result of (N, U+1, V); after the first encoding result is jointed with the first prediction result, a loss function (rnnt_loss_simple) and gradient information are calculated, and pruning bounds with dimensions of (N, T, s_range, V) are calculated according to the gradient information; the first encoding result and the first prediction result are respectively pruned by using the pruning bounds to obtain a second encoding result (pruned am) with the dimensions of (N, T, s_range, V) and a second prediction result (pruned lm) with the dimensions of (N, T, s_range, V); a joint processing is performed on the second encoding result and the second prediction result input to a joiner network to obtain a second joint result of (N, T, s_range, V); a loss function (rnnt_loss_pruned) is calculated according to the second joint result, and finally, weighted summation is performed on the loss function (rnnt_loss_simple) and the loss function (rnnt_loss_pruned), and network parameters of the encoder network, the prediction network and the joiner network are adjusted according to an obtained result until the network parameters converge.

In this embodiment, by pruning the first encoding result and the first prediction result and then performing the joint processing, the calculation amount and memory occupation in the joint process can be reduced, and then the calculation amount and memory occupation in the process of training the neural network model can be reduced.

According to a second aspect of the embodiments of the present disclosure, there is provided a method for audio processing, including:

inputting audio data to be processed into a neural network to obtain a target text, wherein the neural network is trained in advance by using the method for training the neural network described in the first aspect.

Figure 5:
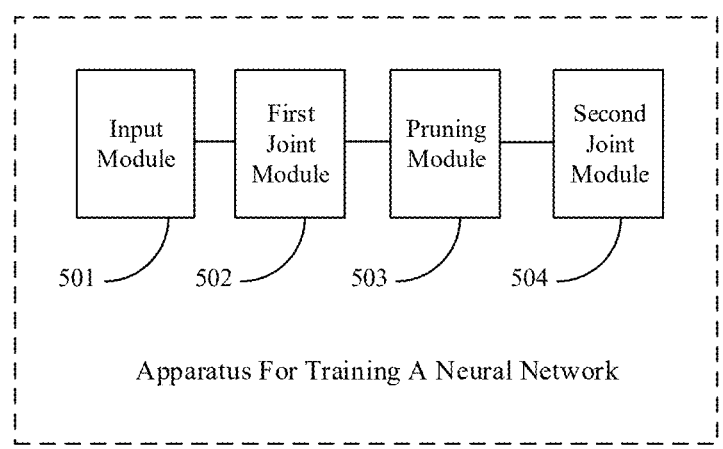
FIG. 5 is a structural schematic diagram illustrating an apparatus for training a neural network according to an embodiment of the present disclosure.

According to a third aspect of the embodiments of the present disclosure, there is provided an apparatus for training a neural network. Referring to FIG. 5, the apparatus for training a neural network includes:

an input module 501 configured to encode training audio data input to an encoder network to obtain a first encoding result, and predict a text label corresponding to the training audio data input to a prediction network to obtain a first prediction result;

a first joint module 502 configured to joint the first encoding result with the first prediction result to obtain a first joint result;

a pruning module 503 configured to prune the first encoding result and the first prediction result respectively according to the first joint result to obtain a second encoding result and a second prediction result; and a second joint module 504 configured to perform a joint processing on the second encoding result and the second prediction result input to a joiner network to obtain a second joint result, and adjust network parameters of the encoder network, the prediction network and the joiner network according to the second joint result.

In some embodiments of the present disclosure, the first joint module 502 is configured to:

perform a joint processing on the first encoding result and the first prediction result input to a joint module to obtain the first joint result.

In some embodiments of the present disclosure, each element in the first joint result at least has a coordinate in an audio frame number dimension and a coordinate in a text label sequence dimension.

In some embodiments of the present disclosure, the pruning module 503 is configured to:

obtain gradient information of the each element in the first joint result;

determine pruning bounds in a plane composed of the audio frame number dimension and the text label sequence dimension according to the gradient information of the each element in the first joint result; and prune the first encoding result and the first prediction result respectively according to the pruning bounds to obtain the second encoding result and the second prediction result.

In some embodiments of the present disclosure, when obtaining the gradient information of the each element in the first joint result, the pruning module 503 is configured to:

obtain gradient information indicating a probability that the each element in the first joint result outputs the text label and gradient information indicating a probability that the each element in the first joint result outputs a null character.

In some embodiments of the present disclosure, when determining the pruning bounds in the plane composed of the audio frame number dimension and the text label sequence dimension according to the gradient information of the each element in the first joint result, the pruning module 503 is configured to:

at a $t^{th}$ frame in the audio frame number dimension, determine a sum of gradient information of respective elements in a sequence range of a preset size starting from each serial number in the text label sequence dimension as a total gradient corresponding to the each serial number, wherein t is an integer greater than or equal to 1; and determine a sequence range of the preset size starting from a serial number for which the total gradient is maximum as the pruning bounds of the $t^{th}$ frame.

In some embodiments of the present disclosure, the serial number for which the total gradient is maximum satisfies at least one of the following:

a difference between the serial number for which the total gradient is maximum and a maximum serial number in the text label sequence dimension is greater than or equal to the preset size;

the serial number for which the total gradient is maximum is less than or equal to a starting point serial number of pruning bounds of a $(t+1)^{th}$ frame;

a difference between the serial number for which the total gradient is maximum and the starting point serial number of the pruning bounds of the $(t+1)^{th}$ frame is less than the preset size.

In some embodiments of the present disclosure, when pruning the first encoding result and the first prediction result respectively according to the pruning bounds to obtain the second encoding result and the second prediction result, the pruning module 503 is configured to:

expand the first encoding result and the first prediction result on at least one of the audio frame number dimension and the text label sequence dimension respectively, so that each element in the first encoding result has the coordinate in the audio frame number dimension and the coordinate in the text label sequence dimension; and prune the first encoding result and the first prediction result respectively according to the pruning bounds in the plane composed of the audio frame number dimension and the text label sequence dimension to obtain the second encoding result and the second prediction result.

In some embodiments of the present disclosure, when adjusting the network parameters of the encoder network, the prediction network and the joiner network according to the second joint result, the second joint module 504 is configured to:

determine a first network loss value according to the second joint result, and adjust the network parameters of the encoder network, the prediction network and the joiner network according to the first network loss value.

In some embodiments of the present disclosure, the apparatus for training a neural network further includes:

a loss module configured to determine a second network loss value according to the first joint result;

when adjusting the network parameters of the encoder network, the prediction network and the joiner network according to the first network loss value, the second joint module 504 is configured to:

adjust the network parameters of the encoder network, the prediction network and the joiner network according to the first network loss value and the second network loss value.

According to a fourth aspect of the embodiments of the present disclosure, there is provided an apparatus for audio processing, including:

an input module configured to input audio data to be processed into a neural network to obtain a target text, wherein the neural network is trained in advance by using the method for training the neural network described in the first aspect.

Regarding the apparatus in the above embodiment, the specific manner in which each module performs the operation has been described in detail in the embodiment of the method in the first aspect, which will not be elaborated here.

Figure 6:
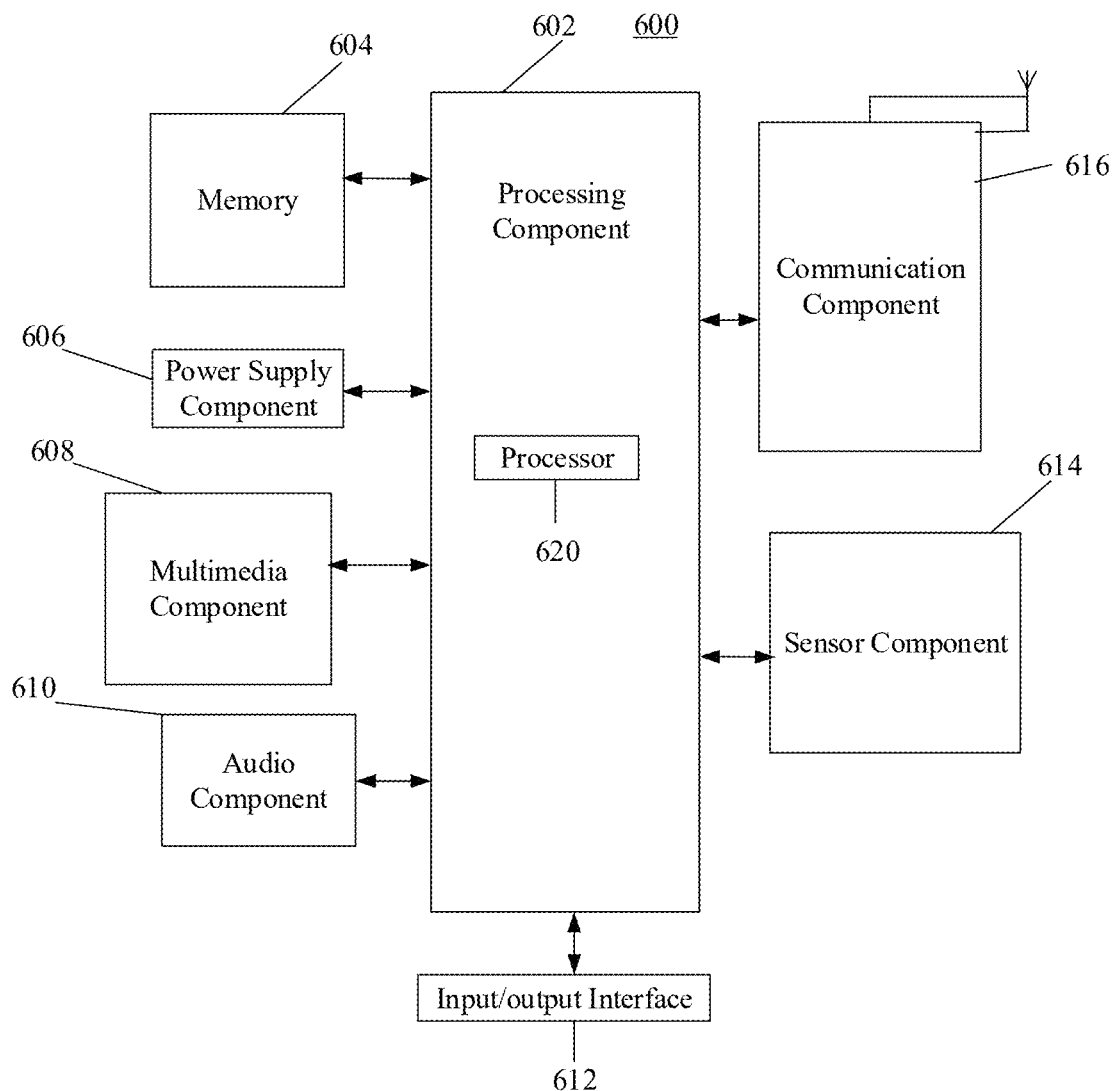
FIG. 6 is a structural block diagram illustrating an electronic device according to an embodiment of the present disclosure.

According to a third aspect of the embodiments of the present disclosure, referring to FIG. 6, it schematically shows a block diagram of an electronic device. For example, the apparatus 600 can be a mobile telephone, a computer, a digital broadcasting terminal, a message receiving and transmitting device, a game console, a tablet device, a medical device, a fitness device, a personal digital assistant, and the like.

Referring to FIG. 6, the apparatus 600 may include one or more of the following components: a processing component 602, a memory 604, a power supply component 606, a multimedia component 608, an audio component 610, an input/output (I/O) interface 612, a sensor component 614 and a communication component 616.

The processing component 602 generally controls overall operations of the apparatus 600, such as operations associated with display, phone calls, data communications, camera operations, and recording operations. The processing component 602 may include one or more processors 620 to execute instructions to complete all or part of the steps of the above methods. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is to store various types of data to support the operation of the apparatus 600. Examples of such data include instructions for any application or method operated on the apparatus 600, contact data, phonebook data, messages, pictures, videos, and so on. The memory 604 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 606 provides power to different components of the apparatus 600. The power supply component 606 may include a power management system, one or more power supplies, and other components associated with generating, managing, and distributing power for the apparatus 600.

The multimedia component 608 includes a screen providing an output interface between the apparatus 600 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 608 may include a front camera and/or a rear camera. The front camera and/or rear camera may receive external multimedia data when the apparatus 600 is in an operating mode, such as a photographing mode or a video mode. Each of the front camera and the rear camera may be a fixed optical lens system or have focal length and optical zooming capability.

The audio component 610 is configured to output and/or input an audio signal. For example, the audio component 610 includes a microphone (MIC). When the apparatus 600 is in an operating mode, such as a call mode, a recording mode, and a voice recognition mode, the MIC is to receive an external audio signal. The received audio signal may be further stored in the memory 604 or transmitted via the communication component 616. In some embodiments, the audio component 610 further includes a speaker to output an audio signal.

The I/O interface 612 may provide an interface between the processing component 602 and peripheral interface modules. The above peripheral interface modules may include a keyboard, a click wheel, buttons and so on. These buttons may include, but are not limited to, a home button, a volume button, a starting button and a locking button.

The sensor component 614 includes one or more sensors to provide status assessments of various aspects for the apparatus 600. For example, the sensor component 614 may detect the on/off status of the apparatus 600, and relative positioning of component, for example, the component is a display and a keypad of the apparatus 600. The sensor component 614 may also detect a change in position of the apparatus 600 or a component of the apparatus 600, a presence or absence of the contact between a user and the apparatus 600, an orientation or an acceleration/deceleration of the apparatus 600, and a change in temperature of the apparatus 600. The sensor component 614 may include a proximity sensor to detect the presence of a nearby object without any physical contact. The sensor component 614 may further include an optical sensor, such as a Complementary Metal Oxide Semiconductor (CMOS) or Charge-coupled Device (CCD) image sensor which is used in imaging applications. In some embodiments, the sensor component 614 may further include an acceleration sensor, a gyroscope sensor, a magnetic sensor, a pressure sensor, or a temperature sensor.

The communication component 616 is to facilitate wired or wireless communication between the apparatus 600 and other devices. The apparatus 600 may access a wireless network that is based on a communication standard, such as Wi-Fi, 2G or 3G, or a combination thereof. In an embodiment, the communication component 616 receives a broadcast signal or broadcast-associated information from an external broadcast management system via a broadcast channel. In an embodiment, the communication component 616 further includes a Near Field Communication (NFC) module to facilitate short-range communications. For example, the NFC module may be implemented based on a Radio Frequency Identification (RFID) technology, an Infra-red Data Association (IrDA) technology, an Ultra-Wide Band (UWB) technology, a Blue Tooth (BT) technology and other technologies.

In an embodiment, the apparatus 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an embodiment, there is also provided a non-transitory computer readable storage medium including instructions, such as the memory 604 including instructions. The instructions may be executed by the processor 620 of the apparatus 600 to perform the above described methods. For example, the non-transitory computer readable storage medium may be a ROM, a Random Access Memory (RAM), a CD-ROM, a magnetic tape, a floppy disk, an optical data storage device, and the like.

With the method and apparatus for training the neural network, and the method and apparatus for audio processing provided by the embodiments of the present disclosure, by encoding training audio data input to an encoder network to obtain a first encoding result, and predicting a text label corresponding to the training audio data input to a prediction network to obtain a first encoding result with the first prediction result can be jointed to obtain a first joint result, the first encoding result and the first prediction result are respectively pruned according to the first joint result to obtain a second encoding result and a second prediction result, finally, a joint processing is performed on the second encoding result and the second prediction result input to a joiner network to obtain a second joint result, and then network parameters of the encoder network, the prediction network and the joiner network are adjusted according to the second joint result. Since the first encoding result and the first prediction result are pruned and then input to the joiner network, the calculation amount of the joiner network can be reduced, and the calculation power of adjusting the network parameters by the second joint result can be reduced, therefore, the memory occupied in a process of training a model such as the RNN-T can be reduced, the fast calculation can be realized, and the practicability of the audio processing technologies can be improved.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method for training a neural network, comprising:
encoding, by at least one processor, training audio data input to an encoder network to obtain a first encoding result, and predicting a text label corresponding to the training audio data input to a prediction network to obtain a first prediction result;
jointing, by the at least one processor, the first encoding result with the first prediction result to obtain a first joint result;
pruning, by the at least one processor, the first encoding result and the first prediction result according to the first joint result respectively to obtain a second encoding result and a second prediction result; and
performing, by the at least one processor, a joint processing on the second encoding result and the second prediction result input to a joiner network to obtain a second joint result, and adjusting network parameters of the encoder network, the prediction network and the joiner network according to the second joint result.

2. The method according to claim 1, wherein jointing the first encoding result with the first prediction result to obtain the first joint result comprises:
performing a joint processing on the first encoding result and the first prediction result input to a joint module to obtain the first joint result.

3. The method according to claim 1, wherein each element in the first joint result at least comprises a coordinate in an audio frame number dimension and a coordinate in a text label sequence dimension.

4. The method according to claim 3, wherein pruning the first encoding result and the first prediction result respectively according to the first joint result to obtain the second encoding result and the second prediction result comprises:

obtaining gradient information of the each element in the first joint result;
determining pruning bounds in a plane composed of the audio frame number dimension and the text label sequence dimension according to the gradient information of the each element in the first joint result; and
pruning the first encoding result and the first prediction result according to the pruning bounds respectively to obtain the second encoding result and the second prediction result.

5. The method according to claim 4, wherein obtaining the gradient information of the each element in the first joint result comprises:
obtaining gradient information indicating a probability that the each element in the first joint result outputs the text label and gradient information indicating a probability that the each element in the first joint result outputs a null character.

6. The method according to claim 4, wherein determining the pruning bounds in the plane composed of the audio frame number dimension and the text label sequence dimension according to the gradient information of the each element in the first joint result comprises:
at a $t^{th}$ frame in the audio frame number dimension, determining a sum of gradient information of respective elements in a sequence range of a preset size starting from each serial number in the text label sequence dimension as a total gradient corresponding to the each serial number, wherein t is an integer greater than or equal to 1; and
determining a sequence range of the preset size starting from a serial number for which the total gradient is maximum as the pruning bounds of the $t^{th}$ frame.

7. The method according to claim 6, wherein the serial number for which the total gradient is maximum satisfies at least one of:
a difference between the serial number for which the total gradient is maximum and a maximum serial number in the text label sequence dimension is greater than or equal to the preset size;
the serial number for which the total gradient is maximum is less than or equal to a starting point serial number of pruning bounds of a $(t+1)^{th}$ frame; or
a difference between the serial number for which the total gradient is maximum and the starting point serial number of the pruning bounds of the $(t+1)^{th}$ frame is less than the preset size.

8. The method according to claim 4, wherein pruning the first encoding result and the first prediction result respectively according to the pruning bounds to obtain the second encoding result and the second prediction result comprises:
expanding the first encoding result and the first prediction result on at least one of the audio frame number dimension and the text label sequence dimension respectively, so that each element in the first encoding result has the coordinate in the audio frame number dimension and the coordinate in the text label sequence dimension; and
pruning the first encoding result and the first prediction result according to the pruning bounds in the plane composed of the audio frame number dimension and the text label sequence dimension respectively to obtain the second encoding result and the second prediction result.

9. The method according to claim 1, wherein adjusting the network parameters of the encoder network, the prediction network and the joiner network according to the second joint result comprises:
determining a first network loss value according to the second joint result, and adjusting the network parameters of the encoder network, the prediction network and the joiner network according to the first network loss value.

10. The method according to claim 9, further comprising:
determining a second network loss value according to the first joint result;
wherein adjusting the network parameters of the encoder network, the prediction network and the joiner network according to the first network loss value comprises:
adjusting the network parameters of the encoder network, the prediction network and the joiner network according to the first network loss value and the second network loss value.

11. A method for audio processing, comprising:
inputting audio data to be processed into a neural network to obtain a target text, wherein the neural network is trained in advance by using the method according to claim 1.

12. An electronic device, comprising a memory and at least one processor, wherein the memory is configured to store computer instructions executable on the at least one processor, and when executing the computer instructions, the at least one processor is configured to:
encode training audio data input to an encoder network to obtain a first encoding result, and predicting a text label corresponding to the training audio data input to a prediction network to obtain a first prediction result;
joint the first encoding result with the first prediction result to obtain a first joint result;
prune the first encoding result and the first prediction result according to the first joint result respectively to obtain a second encoding result and a second prediction result; and
perform a joint processing on the second encoding result and the second prediction result input to a joiner network to obtain a second joint result, and adjusting network parameters of the encoder network, the prediction network and the joiner network according to the second joint result.

13. The electronic device according to claim 12, wherein the at least one processor is further configured to:
perform a joint processing on the first encoding result and the first prediction result input to a joint module to obtain the first joint result.

14. The electronic device according to claim 12, wherein each element in the first joint result at least has a coordinate in an audio frame number dimension and a coordinate in a text label sequence dimension.

15. The electronic device according to claim 14, wherein the at least one processor is further configured to:
obtain gradient information of the each element in the first joint result;
determine pruning bounds in a plane composed of the audio frame number dimension and the text label sequence dimension according to the gradient information of the each element in the first joint result; and
prune the first encoding result and the first prediction result respectively according to the pruning bounds to obtain the second encoding result and the second prediction result.

16. The electronic device according to claim 15, wherein the at least one processor is further configured to:

obtain gradient information indicating a probability that the each element in the first joint result outputs the text label and gradient information indicating a probability that the each element in the first joint result outputs a null character.

17. The electronic device according to claim 15, wherein the at least one processor is further configured to:

at a $t^{th}$ frame in the audio frame number dimension, determine a sum of gradient information of respective elements in a sequence range of a preset size starting from each serial number in the text label sequence dimension as a total gradient corresponding to the each serial number, wherein t is an integer greater than or equal to 1; and determine a sequence range of the preset size starting from a serial number for which the total gradient is maximum as the pruning bounds of the $t^{th}$ frame.

18. The electronic device according to claim 15, wherein the at least one processor is further configured to:

expand the first encoding result and the first prediction result on at least one of the audio frame number dimension and the text label sequence dimension respectively, so that each element in the first encoding result has the coordinate in the audio frame number dimension and the coordinate in the text label sequence dimension; and prune the first encoding result and the first prediction result respectively according to the pruning bounds in the plane composed of the audio frame number dimension and the text label sequence dimension to obtain the second encoding result and the second prediction result.

19. The electronic device according to claim 12, wherein the at least one processor is further configured to:

determine a first network loss value according to the second joint result, and adjust the network parameters of the encoder network, the prediction network and the joiner network according to the first network loss value.

20. A non-transitory computer readable storage medium storing a computer program, wherein the computer program, when executed by at least one processor, causing the at least one processor to:

encode training audio data input to an encoder network to obtain a first encoding result, and predicting a text label corresponding to the training audio data input to a prediction network to obtain a first prediction result;

joint the first encoding result with the first prediction result to obtain a first joint result;

prune the first encoding result and the first prediction result according to the first joint result respectively to obtain a second encoding result and a second prediction result; and perform a joint processing on the second encoding result and the second prediction result input to a joiner network to obtain a second joint result, and adjusting network parameters of the encoder network, the prediction network and the joiner network according to the second joint result.

* * * * *